(12) United States Patent
Konchan et al.

(10) Patent No.: US 8,297,689 B2
(45) Date of Patent: Oct. 30, 2012

(54) INDEXING DOOR LATCH STRIKER ENABLING COMPLEX DOOR ARTICULATION

(75) Inventors: Jeffrey L. Konchan, Romeo, MI (US); Louis J. Conrad, Attica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 12/873,626

(22) Filed: Sep. 1, 2010

(65) Prior Publication Data

US 2012/0049581 A1 Mar. 1, 2012

(51) Int. Cl.
*B60J 5/04* (2006.01)
(52) U.S. Cl. ........................................ 296/202
(58) Field of Classification Search ............. 296/202, 296/146.11, 146.9; 49/358; 292/341.15
See application file for complete search history.

(56) References Cited

U.S. PATENT DOCUMENTS 6,386,621 B1 * 5/2002 Kozak et al. ............... 296/155
7,488,029 B2 * 2/2009 Lechkun et al. .......... 296/146.1

* cited by examiner

*Primary Examiner* — H Gutman
(74) *Attorney, Agent, or Firm* — Quinn Law Group, PLLC (57) ABSTRACT

A door of a vehicle is moveable between a closed position, an intermediate position and an open position. When moving between the closed position and the intermediate position, a first vertical edge of the door moves parallel with a body of the vehicle and a second rearward vertical edge of the door moves laterally away from the body of the vehicle. A striker assembly for the door is attached to the body and includes a striker that is moveable between a first position and a second position. A latch mechanism selectively engages the striker when the door is disposed in or moving between the closed position and the intermediate position, with the striker moving with the first edge of the door between the closed position and the intermediate position to prevent lateral movement of the door.

12 Claims, 6 Drawing Sheets

INDEXING DOOR LATCH STRIKER ENABLING COMPLEX DOOR ARTICULATION

TECHNICAL FIELD

The invention generally relates to a striker assembly for a door of a vehicle.

BACKGROUND

Vehicles having a first door and a second door with opposing hinges on the same side of the vehicle, and with no body pillar between the first door and the second door, are typically designed so that the first door and the second door seal to one another, and are thus "dependent". That is, one vehicle door, usually the front door, must be opened before the rear door can be opened, and the rear door must then be closed before the front door can be closed. The doors are dependent so that one door can seal to the other door when the doors are closed, because there is no body pillar between the doors that the doors could otherwise seal against.

One way to allow opposing hinged doors to open independently of each other is to first slide one of the doors parallel with the body of the vehicle and away from the other door to separate one or more seals disposed between the doors, prior to pivoting the door open. In this manner, either door may be opened independently of or simultaneously with the other opposing hinged door. Additionally, in order for the opposing hinged doors to open independently of each other, each must be latched, i.e., secured, to the body of the vehicle, and not to the other door.

SUMMARY

A vehicle is provided. The vehicle includes a body, and a door pivotably coupled to the body. The door includes a first edge extending substantially vertically, and a second edge extending substantially vertically and spaced from the first edge. The door is moveable between a closed position, an intermediate position and an open position. The second edge of the door moves laterally away from the body and the first edge of the door moves parallel with the body when moving from the closed position into the intermediate position. The door pivots about a primary pivot axis such that the first edge of the door swings away from the body when moving from the intermediate position into the open position. The vehicle further includes a latch mechanism that is attached to the door adjacent the first edge of the door. The vehicle further includes a striker assembly that is attached to the body and includes a striker moveable between a first position and a second position. The latch mechanism is engaged with the striker in interlocking engagement to prevent movement of the first edge of the door away from the body when the door is disposed in the closed position or the intermediate position. The striker is moveable with the first edge of the door between the first position and the second position as the door moves between the closed position and the intermediate position.

A striker assembly for selectively engaging a latch mechanism of a vehicle door in interlocking engagement is also provided. The striker assembly includes a base extending along a longitudinal axis and defining a channel, and a striker disposed within the channel and moveable between a first position and a second position. A biasing device interconnects the base and the striker. The biasing device is configured for moving the striker into the second position.

Accordingly, the striker moves with the first edge of the door as the door moves between the closed position and the intermediate position. Because the striker moves with the first edge of the door, the latch mechanism is able to stay engaged with the striker as the door moves between the closed position and the intermediate position, thereby ensuring that the first edge of the door does not pivot into the open position until the second edge of the door is sufficiently spaced from the body to allow the pivoting movement of the door. The biasing device urges the striker into the second position, so that the latch mechanism engages the striker as soon as the door is moved from the open position into the intermediate position, once again preventing unintended pivoting movement of the first edge of the door when moving between the intermediate position and the closed position.

The above features and advantages and other features and advantages of the present invention are readily apparent from the following detailed description of the best modes for carrying out the invention when taken in connection with the accompanying drawings.

DETAILED DESCRIPTION

Figure 1:
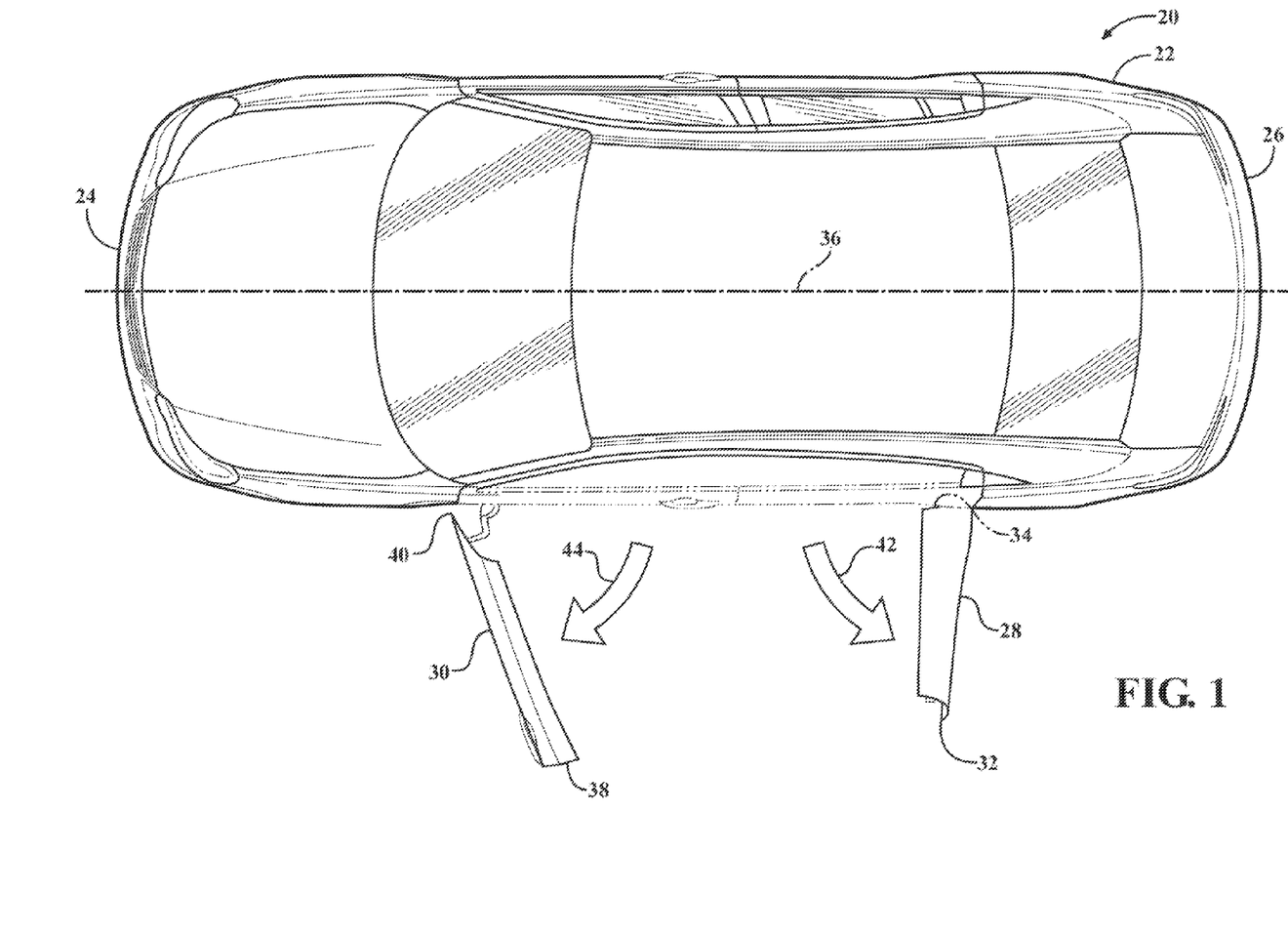
FIG. 1 is a schematic plan view of a vehicle having a pair of opposing hinged doors.

Referring to the Figures, wherein like numerals indicate like parts throughout the several views, a vehicle is shown generally at 20 in FIG. 1. Referring to FIG. 1, the vehicle 20 includes a body 22, and a pair of opposing hinged doors. The body 22 may include a frame and any structural support elements attached thereto, as well as the outer sheet metal coverings attached to the frame and/or structural elements of the vehicle 20.

The body 22 includes a first end 24 and a second end 26. The second end 26 of the body 22 is disposed opposite the first end 24 along a longitudinal axis 36 of the body 22. As shown, the first end 24 of the vehicle 20 includes a front of the vehicle 20. However, the first end 24 of the vehicle 20 is not limited to the front of the vehicle 20. As shown, the second end 26 includes a back end of the vehicle 20. However, the second end 26 of the vehicle 20 is not limited to the back of the vehicle 20. The longitudinal axis 36 extends between the first end 24 and the second end 26 of the vehicle 20.

The pair of opposing hinged doors includes a first door 28 and a second door 30. The first door 28 and the second door 30 are disposed on the same side of the vehicle 20, adjacent each other, and open in opposite directions, away from each other to provide a continuous, i.e., unobstructed, opening into an interior compartment of the vehicle 20. The first door 28 and the second door 30 are "opposing hinged doors" because the first door 28 and the second door 30 pivot open in opposite directions. The opposing hinged doors allow for the continuous opening defined by the body 22, with no B-pillar disposed between the first door 28 and the second door 30. The first door 28 and the second door 30 are independently openable and closeable, i.e., may be opened and closed in either order or simultaneously. Because the opening defined by the body 22 is continuous, with no B-pillar between the first door 28 and the second door 30, the first door 28 and the second door 30 define a joint therebetween that should be sealed.

As shown, the first door 28 is disposed nearer the second end 26 of the body 22 than the second door 30, and the second door 30 is disposed nearer the first end 24 of the body 22 than the first door 28. However, it should be appreciated that the positions of the first door 28 and the second door 30 relative to the first end 24 and the second end 26 of the vehicle 20 may be reversed from that shown in the Figures. Additionally, while the first door 28 and the second door 30 are shown in the Figures as passenger access doors on a side of the vehicle 20, it should be appreciated that the first door 28 and the second door 30 may be positioned elsewhere on the vehicle 20, and may include any type of closure panels, including but not limited to rear cargo doors of a cargo van.

The first door 28 includes a first edge 32 extending substantially vertically and a second edge 34 extending substantially vertically and spaced from the first edge 32. The second edge 34 of the first door 28 is disposed opposite the first edge 32 along the longitudinal axis 36 of the body 22. Accordingly, the first edge 32 and the second edge 34 of the first door 28 define a forward edge and a rearward edge of the first door 28. As shown, the first edge 32 of the first door 28 is disposed nearer the first end 24 of the body 22 than the second edge 34 of the first door 28, and the second edge 34 of the first door 28 is disposed nearer the second end 26 of the body 22 than the first edge 32 of the first door 28. However, it should be appreciated that the positions of the first edge 32 the second edge 34 of the first door 28 may be reversed from that shown in the Figures.

The second door 30 is pivotably attached to the body 22. The second door 30 includes a first edge 38 and a second edge 40. The first edge 38 of the second door 30 is disposed opposite the second edge 40 along the longitudinal axis 36 of the body 22. Accordingly, the first edge 38 and the second edge 40 of the second door 30 define a forward edge and a rearward edge of the second door 30. As shown, the first edge 38 of the second door 30 is disposed nearer the second end 26 of the body 22 than the second edge 40 of the second door 30, and the second edge 40 of the second door 30 is disposed nearer the first end 24 of the body 22 than the first edge 38 of the second door 30. However, it should be appreciated that the positions of the first edge 38 and the second edge 40 of the second door 30 may be reversed from that shown in the Figures.

Figure 2:
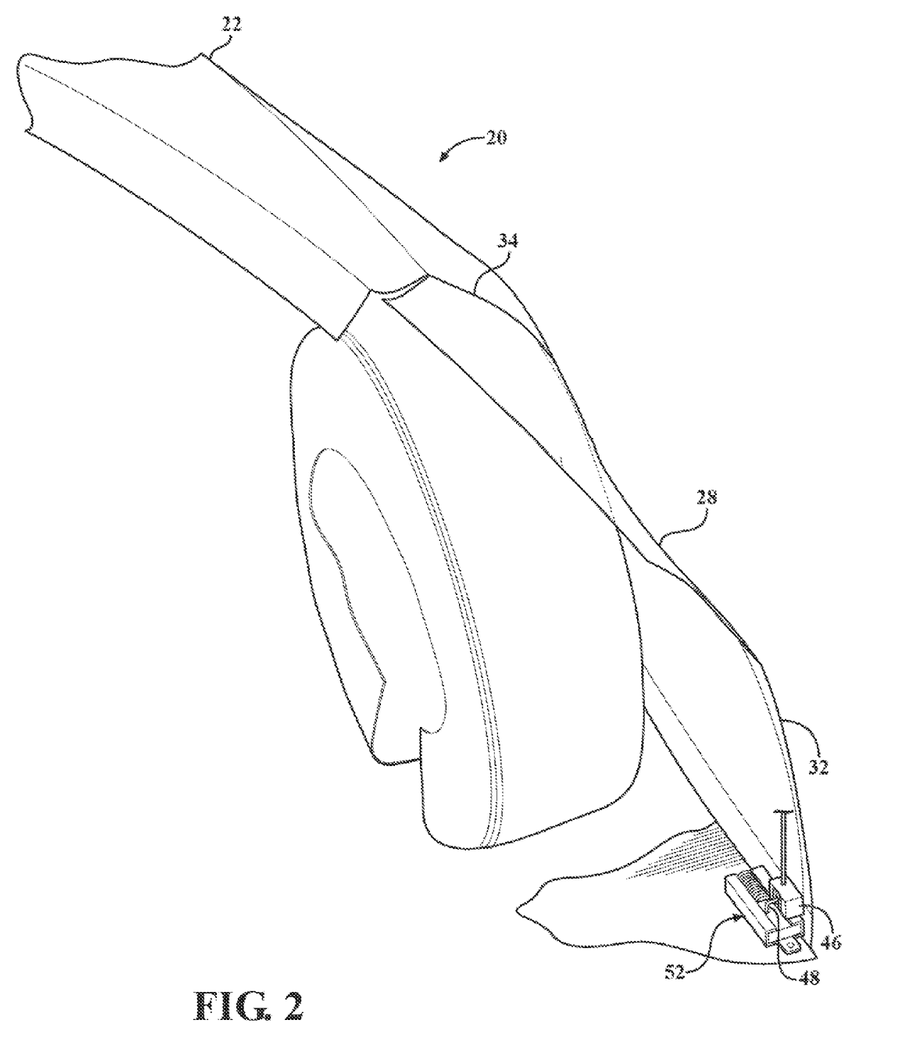
FIG. 2 is a schematic plan view of a first door of the pair of opposing hinged doors in a closed position.
Figure 3:
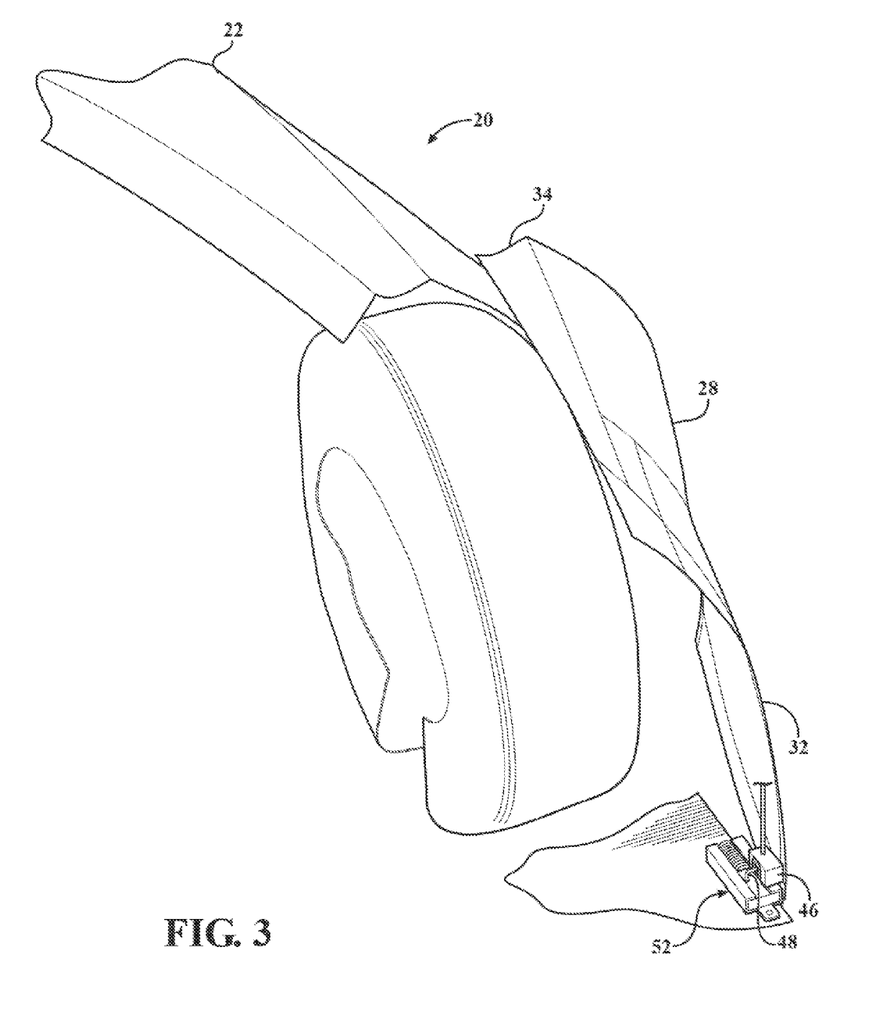
FIG. 3 is a schematic plan view of the first door in an intermediate position.
Figure 4:
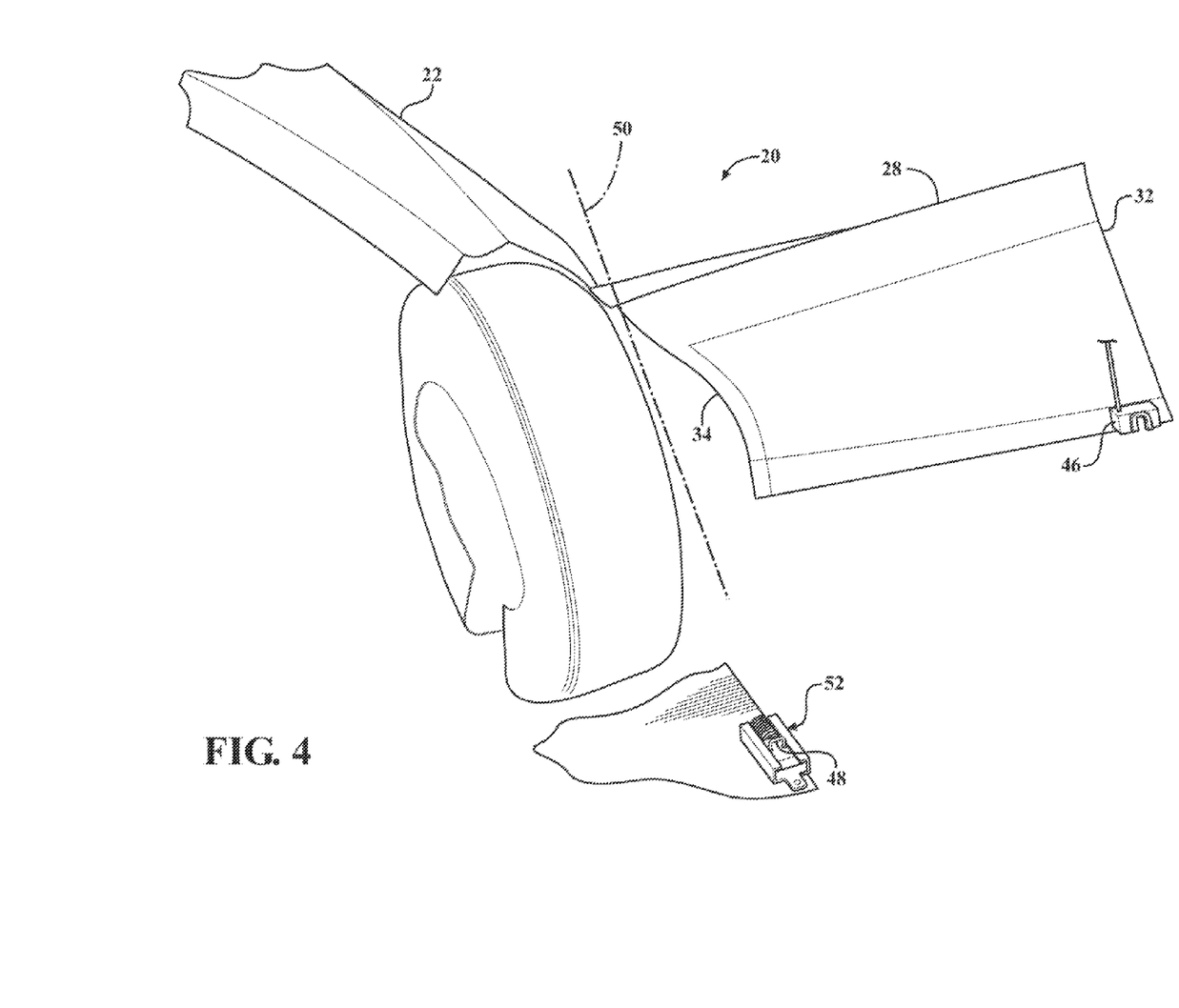
FIG. 4 is a schematic plan view of the first door in an open position.

Referring also to FIGS. 2 through 4, the first door 28 is moveable between a closed position, shown in FIG. 2, an intermediate position, shown in FIG. 3, and an open position, shown in FIG. 4. The first door 28 pivots into the open position in a first pivot direction 42. The second door 30 pivots open in a second pivot direction 44. The second pivot direction 44 is opposite the first pivot direction 42. The first pivot direction 42 includes one of a counterclockwise direction and a clockwise direction, and the second pivot direction 44 includes the other of the counterclockwise direction and the clockwise direction.

The first door 28 moves from the closed position, into the intermediate position, and then into the open position in succession when opening the first door 28. The first door 28 moves from the open position, into the intermediate position, and then into the closed position in succession when closing the first door 28. When the first door 28 is in the closed position, the first edge 32 and the second edge 34 of the first door 28 are disposed substantially parallel with the longitudinal axis 36 of the body 22. To open the first door 28, the first door 28 moves from the closed position into the intermediate position. When the first door 28 moves from the closed position into the intermediate position, the second edge 34 of the first door 28 moves laterally relative to the longitudinal axis 36 of the body 22, away from the body 22 and into a pivot position. Additionally, the first edge 32 of the first door 28 moves parallel with the longitudinal axis 36, away from the second door 30 when the first door 28 moves from the closed position into the intermediate position.

The pivot position is the position the second edge 34 of the first door 28 must be in relative to the body 22 to allow the first door 28 to pivot open and closed, without interfering with the second door 30 and/or the body 22. In order to ensure that the first door 28 pivots into the open position only when the hinge assembly is in the pivot position, the first door 28 includes a latch mechanism 46. The latch mechanism 46 is attached to the first door 28 adjacent the first edge 32 of the first door 28. The latch mechanism 46 engages a striker 48 in interlocking engagement when the first door 28 is in the closed position or the intermediate position, or is disposed between the closed position and the intermediate position. The latch mechanism 46 may include any type, size, style and/or configuration of latch suitable for use on a closure panel and capable of securely grasping the striker 48. Accordingly, the latch mechanism 46 is not described in detail herein.

Once the first door 28 is disposed in the intermediate position, the latch mechanism 46 is disengaged from the striker assembly 52 to allow pivotal movement of the first edge 32 of the first door 28 about a primary pivot axis 50 and into the open position. When the first door 28 moves from the intermediate position into the open position, the first door 28 pivots about the primary pivot axis 50 such that the first edge 32 of the first door 28 swings laterally away from the body 22. To close the first door 28, the steps described above for opening the first door 28 are executed in reverse order. In this manner, the first door 28 is moveable between the closed position, the intermediate position and the open position independently of the second door 30.

Figure 5:
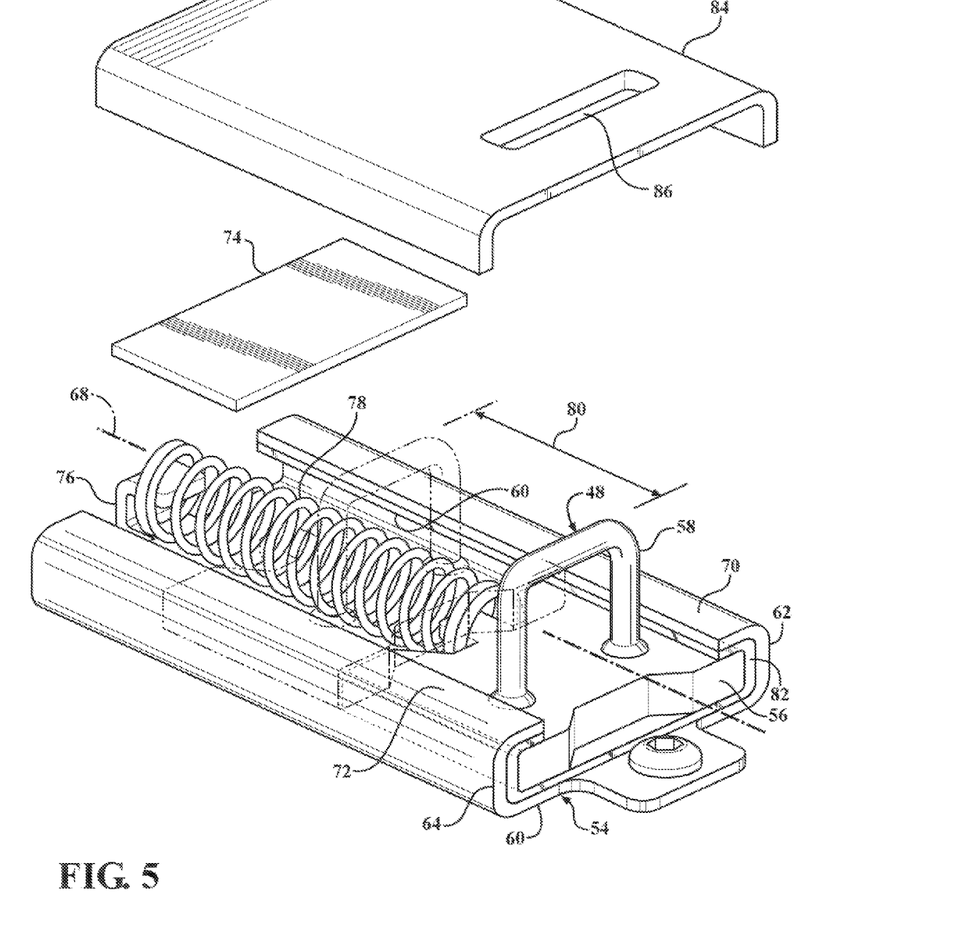
FIG. 5 is a schematic partially exploded perspective view of a striker assembly.

Referring to FIG. 5, a striker assembly 52 is attached to the body 22 and includes the striker 48. The striker assembly 52 includes a base 54. The base 54 is fixedly attached to the body 22. The striker 48 includes a plate 56 and a wire loop 58 extending perpendicularly outward away from the plate 56. As noted above, the latch mechanism 46 selectively engages the striker 48, and more specifically the wire loop 58, in interlocking engagement. The plate 56 is slideably moveable relative to the base 54, such that the striker 48 is moveable between a first position and a second position, shown in phantom in FIG. 5.

The base 54 includes a bottom wall 60, a first side wall 62 and a second side wall 64. The bottom wall 60, the first side wall 62 and the second side wall 64 cooperate together to define a channel 66. The channel 66 extends along a longitudinal axis 68 of the base 54. The plate 56 of the striker 48 is disposed within and moveable along the channel 66. The first side wall 62 includes a first ledge 70 spaced from the bottom wall 60. The first ledge 70 extends parallel with the bottom wall 60, and toward the second side wall 64. The second side wall 64 includes a second ledge 72 spaced from the bottom wall 60. The second ledge 72 extends parallel with the bottom wall 60 and toward the first side wall 62. The first ledge 70 and the second ledge 72 are disposed over the plate 56, with the plate 56 disposed between the bottom wall 60, the first ledge 70 and the second ledge 72 to secure the plate 56 within the channel 66.

The base 54 may include a support 74 configured to brace and secure the first side wall 62 and the second side wall 64 relative to each other. For example, the support 74 may be disposed at an axial end of the base 54, and extend between the first side wall 62 and the second side wall 64, across the channel 66.

Figure 6:
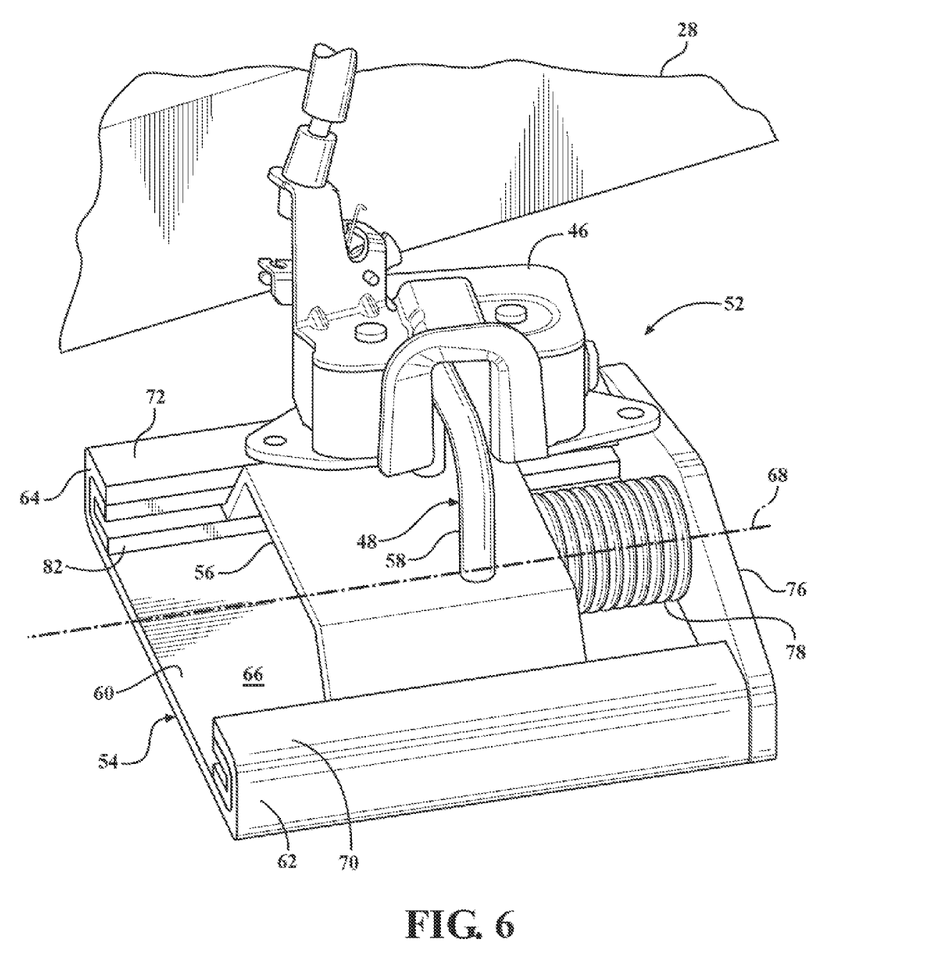
FIG. 6 is a schematic perspective view of an alternative embodiment of the striker assembly engaged with a latch mechanism of the first door.

The base 54 includes an end wall 76, which is disposed at a longitudinal end of the bottom wall 60. A biasing device 78 is disposed between the end wall 76 and the plate 56 of the striker 48. The biasing device 78 is configured for biasing the striker 48 into the second position. The biasing device 78 may include, but is not limited to, one of an extension spring, shown in FIG. 5, and a compression spring, shown as an alternative embodiment in FIG. 6.

As noted above, the striker 48 is moveable between the first position and the second position. The striker 48 is moveable an index distance 80. The index distance 80 may be any distance suitable to separate the first door 28 from the second door 30 to allow pivotal movement of the first door 28 relative to the second door 30 without damaging the second door 30 and/or any seals between the first door 28 and the second door 30. For example, the index distance 80 may be equal to, but is not limited to, twenty five millimeters (25 mm). As shown and described herein, the first position of the striker 48 is associated with the closed position of the door, and the second position is associated with the intermediate position of the door. As such, when the door is in the closed position, the striker 48 is in the first position. Similarly, when the door is in the intermediate position, the striker 48 is in the second position. However, it should be appreciated that the first position and the second position of the striker 48 may be reversed from that described herein.

The latch mechanism 46 is engaged with the striker 48 in interlocking engagement to prevent movement of the first edge 32 of the door away from the body 22 when the door is disposed in the closed position, the intermediate position, or any position between the closed position and the intermediate position. The striker 48 is moveable with the first edge 32 of the door between the first position and the second position as the door moves between the closed position and the intermediate position.

The biasing device 78 biases the striker 48 into the second position so that the striker 48 remains in the second position when the door is in the open position. This ensures that when the door moves back into the intermediate position from the open position, the latch mechanism 46 is able to engage the striker 48 in interlocking engagement before moving into the closed position.

The base 54 may include a coating 82 that slideably supports 74 the plate 56 of the striker 48. The coating 82 includes a low coefficient of friction to reduce sliding friction between the plate 56 and the base 54. For example, the coating 82 may include, but is not limited to, a layer of perfluorinated polyether (PFPE).

The striker assembly 52 may further include a cover 84 disposed over the channel 66. The cover 84 may include and be manufactured from, but is not limited to, a plastic or similar material. The cover 84 is moveable with the striker 48 relative to the base 54. As shown, the cover 84 includes a slot 86 through which the wire loop 58 extends through.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a body;
a door pivotably coupled to the body and including a first edge extending substantially vertically and a second edge extending substantially vertically and spaced from the first edge, wherein the door is moveable between a closed position, an intermediate position and an open position, with the second edge of the door moving laterally away from the body and the first edge of the door moving parallel with the body when moving from the closed position into the intermediate position, and with the door pivoting about a primary pivot axis such that the first edge of the door swings away from the body when moving from the intermediate position into the open position;
a latch mechanism attached to the door adjacent the first edge of the door; and
a striker assembly attached to the body and including a striker moveable between a first position and a second position, wherein the latch mechanism is engaged with the striker in interlocking engagement to prevent movement of the first edge of the door away from the body when the door is disposed in the closed position or the intermediate position, with the striker moveable with the first edge of the door between the first position and the second position as the door moves between the closed position and the intermediate position;
wherein the striker is disposed in the first position when the door is in the closed position, and the striker is disposed in the second position when the door is disposed in the intermediate position or the open position;
wherein the striker assembly includes a biasing device configured for biasing the striker into the second position; and
wherein the striker assembly includes a base and the striker includes a plate and a wire loop extending perpendicularly outward away from the plate, with the plate slideably moveable relative to the base.

2. A vehicle as set forth in claim 1 wherein the biasing device includes one of a compression spring and an extension spring.

3. A vehicle as set forth in claim 1 wherein the base includes a bottom wall, a first side wall and a second side wall cooperating together to define a channel extending along a longitudinal axis of the base, with the plate of the striker disposed within the channel.

4. A vehicle as set forth in claim 3 wherein the first side wall includes a first ledge spaced from the bottom wall and extending parallel with the bottom wall and toward the second side wall, and the second side wall includes a second ledge spaced from the bottom wall and extending parallel with the bottom wall and toward the first side wall, such that the first ledge and the second ledge secure the plate within the channel.

5. A vehicle as set forth in claim 3 wherein the base includes an end wall disposed at a longitudinal end of the bottom wall, with the biasing device disposed between the end wall and the plate of the striker.

6. A vehicle as set forth in claim 3 wherein the base includes a coating slideably supporting the plate of the striker.

7. A vehicle as set forth in claim 6 wherein the coating includes a layer of perfluorinated polyether (PFPE).

8. A vehicle as set forth in claim 3 wherein the base includes a support extending between the first side wall and the second side wall and across the channel.

9. A vehicle as set forth in claim 3 wherein the striker assembly includes a cover disposed over the channel.

10. A vehicle as set forth in claim 9 wherein the cover is moveable with the striker relative to the base.

11. A vehicle as set forth in claim 1 wherein the striker is moveable between the first position and the second position an index distance equal to twenty five millimeters (25 mm).

12. A vehicle as set forth in claim 1 wherein the latch mechanism disengages the striker when the door moves into the intermediate position to allow the door to move into the open position.

* * * * *